United States Patent
Rossnagel

[19]

[11] Patent Number: 5,843,197
[45] Date of Patent: Dec. 1, 1998

[54] PARTICULATE REMOVAL APPARATUS FOR USE IN SOLDERING OPERATIONS

[76] Inventor: Bryan Rossnagel, 6401 Bingle Rd. #105, Houston, Tex. 77092

[21] Appl. No.: 905,519

[22] Filed: Aug. 4, 1997

[51] Int. Cl.$^6$ .................................................. B01D 46/00
[52] U.S. Cl. ............................ 55/385.2; 55/472; 55/473; 55/DIG. 18
[58] Field of Search .................................. 55/385.2, 473, 55/472, DIG. 18; 361/24, 42

[56] References Cited

U.S. PATENT DOCUMENTS

| | | | |
|---|---|---|---|
| 3,577,710 | 5/1971 | Feldman | 55/473 |
| 3,796,550 | 3/1974 | Hall . | |
| 3,850,086 | 11/1974 | Walters et al. . | |
| 3,880,061 | 4/1975 | Hensiek et al. . | |
| 4,043,257 | 8/1977 | Aaberg . | |
| 4,099,215 | 7/1978 | Parrier et al. | 361/42 |
| 4,333,745 | 6/1982 | Zeanwick . | |
| 4,408,244 | 10/1983 | Weible | 361/24 |
| 4,560,395 | 12/1985 | Davis | 55/385.2 |
| 4,778,496 | 10/1988 | Conrad | 55/473 |
| 4,832,717 | 5/1989 | Peters | 55/DIG. 18 |
| 4,912,857 | 4/1990 | Parent et al. . | |
| 4,917,713 | 4/1990 | Helmus | 55/473 |
| 5,188,644 | 2/1993 | Landy | 55/473 |
| 5,358,443 | 10/1994 | Mitchell et al. | 55/473 |
| 5,364,425 | 11/1994 | Simon et al. | 55/385.2 |
| 5,395,410 | 3/1995 | Jang | 55/472 |
| 5,410,120 | 4/1995 | Taylor . | |
| 5,624,309 | 4/1997 | Schuepstuhl et al. . | |

*Primary Examiner*—Jay H. Woo
*Assistant Examiner*—Minh-Chau T. Pham
*Attorney, Agent, or Firm*—Harrison & Egbert

[57] ABSTRACT

A particulate removal apparatus for use in soldering operations having a housing with an inlet opening formed therein and an interior cavity, a filter positioned within the housing for removing particles from air passing therethrough, an impeller positioned within the interior cavity of the housing, and a motor positioned within the interior cavity of the housing and positioned between the impeller and the filter. The impeller has backward inclined impeller blades. The impeller pulls air through the inlet opening and directs the air toward a wall of the interior cavity. The impeller blades generally surround the interior opening. The filter is a HEPA filter positioned within a framework within the housing. The HEPA filter is arranged in an accordion-style folded configuration within the framework.

18 Claims, 5 Drawing Sheets

PARTICULATE REMOVAL APPARATUS FOR USE IN SOLDERING OPERATIONS

TECHNICAL FIELD

The present invention relates to devices for the removal of fumes from soldering operations. More particularly, the present invention relates to stand-alone devices for pulling and filtering particate-laden air so as to produce a filtered air output.

BACKGROUND ART

Manufacturing processes often generate noxious fumes during processing. These fumes are typically unwanted but inherent by-products of the manufacturing process. For example, solvent fumes are typically emitted from baths used for washing metal parts. Manufacturing of electrical components and electronic circuit boards also creates noxious fumes which arise from the soldering activities of attaching and detaching electrical components in devices such as relays, power supplies, and the like, and electronic components to circuit boards. The fumes generated by soldering or desoldering of electrical/electronic components are at the very least an irritant to the worker. High concentrations of these fumes may cause illness. Government regulations require removal and venting of the fumes to protect workers.

Devices have been provided for removal of these fumes from the work place. One device uses a vacuum to extract fumes from soldering work areas and to pass the fumes through a filter. The fume filter includes a pleated pre-filter for removal of large particulates, a HEPA filter filter for removing particles down to about 0.3 micron, and an activated carbon filter for removal of volatile compounds and odors in the fumes. The vacuum and filter device connects through hoses to articulatable arms that mount adjacent the work stations. The arms comprise pivotally interconnected tubes with nozzles attached to distal ends. The nozzles typically are elongated tubes having a slit for communicating the fumes to the filter, although cylindrical nozzles and funnel nozzles are known. The worker soldering electronic components moves the articulatable arm to position the nozzle within a proximal area of the solder work. The vacuum apparatus induces a suction through the nozzle for pulling the solder fumes in the general area of the nozzle into the tube and to the filter apparatus.

Other fume removal devices attach a suction nozzle to the soldering iron adjacent the heating tip. The inlet of this vacuum device is thereby positioned adjacent the primary source of the solder fumes. A portion of the fumes, however, escape to the atmosphere.

While these devices have accomplished the purpose of removing some of the solder fumes from work stations, there are problems associated with their use. In particular, stand alone vacuum devices require powerful motors to facilitate connection of lengths of tubes for multiple work stations. The removal of the solder fumes by the exhaust arms in the work areas is limited in the range of extraction due to the suction limitations of the vacuum devices. Typically, the vacuums have relatively low suction pressures and therefore are capable of effecting removal of solder fumes from a limited area. As discussed below, low suction is required to reduce build-up of static electricity in the work area. As the worker places components on various parts of the circuit board, the distal portions of the work area away from the location of the nozzle may insufficiently experience the suction effects from the nozzle. Accordingly, some fumes are not collected and as a consequence, the worker must stop work and reposition the nozzle as the work progresses over the circuit board in the work area.

There are also drawbacks with placing the vacuum nozzle on the soldering iron. While the nozzle adjacent the heating tip provides recovery from the primary source of solder fumes, the heating tip is being continually cooled. This increases the time required to effect a solder joint. Also, the soldering iron is more bulky and with the suction hose is more difficult to handle than a soldering iron without such vacuum system. The suction hose in this device typically is of small diameter and tends to clog easily which reduces the effectiveness of removing solder fumes.

In addition to the need to remove and filter solder fumes, electronics manufacture also has a need to control or eliminate the problem of static electricity built-up in the work area. Assembling electronic components requires static-free environments in order to avoid the damaging effects on electronic components by discharge of static electricity which may destroy components such as IC chips and the like. Static electricity is created in a variety of ways. Air movement itself across a work area may create a build-up of static electricity. Air blowing on worker's hands can also create discomfort for the worker. Thus the suction in vacuum devices can not be so great as to induce significant air currents across the work area. The clothing and the body of workers also can create, hold, and discharge static electricity into electronic components. To reduce the risk of build-up and discharge of static electricity, workers are often electrically grounded to the work stations by ground straps.

It is an object of the present invention to provide an apparatus that effectively removes and filters fumes which occur in soldering operations.

Is is another object of the present invention to provide an apparatus that creates sufficient suction so as to effectively remove fumes without a complicated "work station" type of configuration.

It is a further object of the present invention to provide a particulate removal apparatus which is portable.

It is a further object of the present invention to provide a particulate removal apparatus which serves to prevent static discharge.

It is still another object of the present invention to provide a particulate removal apparatus which evenly distributes the flow of particulate-laden air over an entire surface of a HEPA filter.

It is another object of the present invention to provide a particulate removal apparatus which is easy to manufacture, and easy to use, and relatively inexpensive.

These and other objects and advantages of the present invention will become apparent from a reading of the attached specification and appended claims.

SUMMARY OF THE INVENTION

The present invention is a particulate removal apparatus for use in a soldering operation that comprises a housing having an inlet opening formed therein and having an interior cavity, a filter means positioned within the housing for removing particulates from air passing therethrough, an impeller means positioned within the interior cavity of the housing and a motor means positioned within the interior cavity of the housing for rotating the impeller means. The impeller means has backward inclined impeller blades so as to direct air passing through the inlet toward the wall of the interior cavity. The impeller blades generally surround the inlet opening. The filter means has an outlet for passing filtered air from the housing.

In the present invention, the housing is formed of a conductive material which is self-grounded so as to prevent static discharge. The housing is fuse protected so as to prevent electrical flow in the event of a short circuit. The housing has a front surface with an inlet slot formed across a bottom edge of the front surface. The inlet slot is in fluid communication with the inlet opening. The housing has a generally flat lower surface extending above the inlet slot. The inlet opening is formed in this flat lower surface located generally centrally in the flat lower surface.

The impeller blades of the impeller radiate outwardly from a periphery of the inlet opening. The impeller blades are supported on an annular rim. The annular rim is positioned adjacent to the inlet opening such that the annular rim has an inner edge adjacent to the periphery of the inlet opening.

The housing has a horizontal surface or strut extending thereacross. The horizontal strut is positioned between the impeller and the filter. The motor is affixed to the horizontal strut. The impeller has an open interior at a bottom and a closed top. The motor is connected directly to the closed top. The backward inclined impeller blades extend between the bottom rim and the closed top. The backward inclined impeller blades serve to direct air radially outwardly from the open interior toward the wall of the interior cavity.

In the present invention, the filter is a HEPA filter positioned within a framework adjacent to a top of the housing. The HEPA filter serves to remove particles of 0.3 microns at a minimum of 95% efficiency. The HEPA filter is arranged in an accordion fashion within the framework. A first filter screen extends across a top of the HEPA filter and is retained within the framework. A second filter screen extends across a bottom of the HEPA filter and is retained within the framework.

A receptacle is formed within the housing so as to receive the framework of the filter. A filter seal is interposed between a bottom surface of the framework and a horizontal support surface. This filter seal is formed of an elastomeric or a foam material. An arrangement of screws are provided so as to establish compressive contact between the framework of the filter and the filter seal.

DETAILED DESCRIPTION OF THE INVENTION

Figure 1:
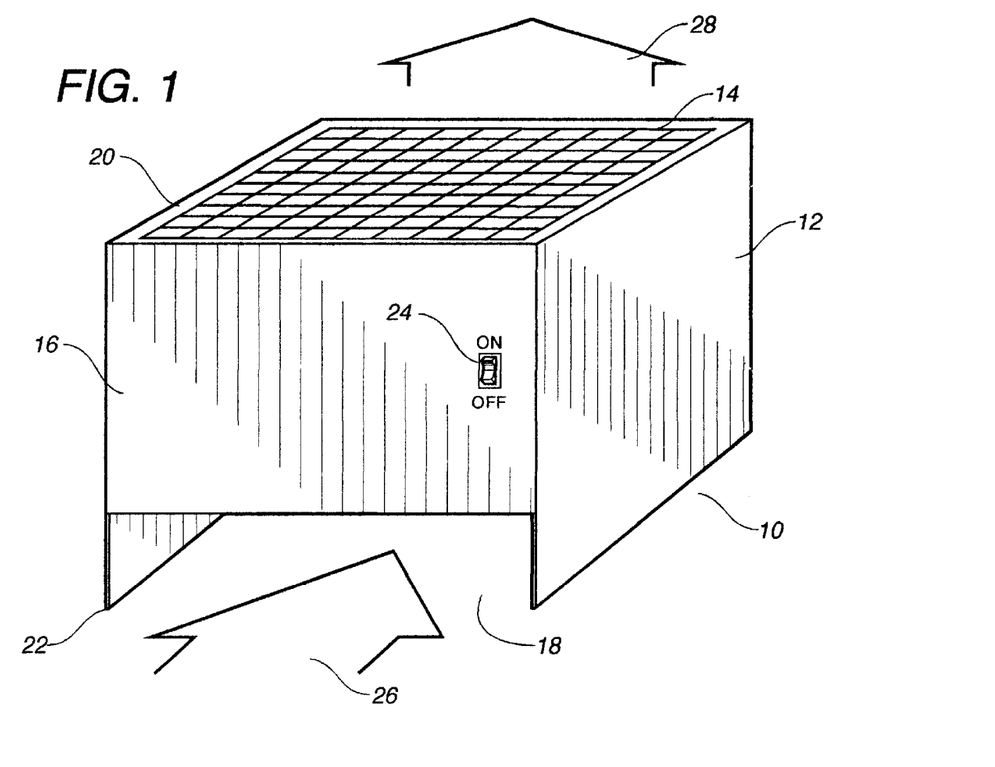
FIG. 1 is a frontal top perspective view of the apparatus of the present invention.

Referring to FIG. 1, there is shown at 10 the particulate removal apparatus of the present invention. It can be seen that the particulate removal apparatus 10 includes a housing 12 and a filter 14. The housing 12 has a front surface 16 which includes an inlet opening 18. The filter 14 is affixed adjacent to the top edge 20 of the housing 12. The filter 14 serves to filter the air passing into the inlet slot 18 adjacent to the bottom edge 22 of the housing 12. The filter 14 is a HEPA filter suitable for the removal of particles of 0.3 microns at a minimum of 95% efficiency.

In FIG. 1, it can be seen that the housing 12 includes the front surface 16 having the slot 18 formed across the bottom edge 22 of the front surface 16. The inlet slot 18 will be in fluid communication with an inlet opening to the interior cavity of the housing 12 (to be described hereinafter). An "on/off" switch 24 is positioned on the front surface 16 of the housing 12 for easy access by the operator. As used herein, the term "inlet slot" refers to an entrance whereby fumes can pass to an impeller and into the interior of the housing 12. For example, a direct mount flange can be used so as to connect the housing directly to smoke generating machinery. Another example would be a snorkel-type flex hose which connects to the inlet.

In FIG. 1, it can be seen that a flow of soldering fumes 26 will enter the inlet slot 18 on the bottom of the front surface 16 of housing 12. When the on/off switch 24 is in its "on" position, a backward inclined impeller on the interior of the housing 12 will pull the fumes into the interior cavity of the housing 12. Eventually, these fumes will pass through the filter 14 and pass outwardly of the top 20 of the housing 12 in the manner illustrated by arrow 28.

In FIG. 1, it can be seen that the housing 12 has a generally cubical configuration. An important aspect of the present invention is that the effective filtering of the soldering fumes occurs from the small cubical volume of the apparatus 10. The actual size of the preferred embodiment of the housing 12 is no more than 9"×9"×9" or a total of 729 cubic inches. It is an important aspect of the present invention that the effective filtering of soldering fumes can occur within such an economically sized housing 12.

In normal use, the apparatus 10 will be placed in the vicinity of the soldering operations such that the inlet slot 18 is positioned close to the soldering operation. The strong suction created by the unique impeller apparatus of the present invention will draw all of the fumes into the interior slot 18. Once the fumes pass through the filter 14, they are emitted in the area of the soldering operation as clean air. The use of the unique HEPA filter in the present invention avoids the release of contaminant fumes in the vicinity of the soldering operations. In the event that the apparatus 10 must be used in another location, the apparatus 10 can simply be unplugged and moved to a new location. The apparatus 10 is also suitable for the removal of other particulates which are generated in other types of operations. The apparatus 10 of the present invention can also be used on stands adjacent to solder pots. As such, the apparatus 10 provides a safe and effective particulate removal device for use in the soldering operations.

Figure 2:
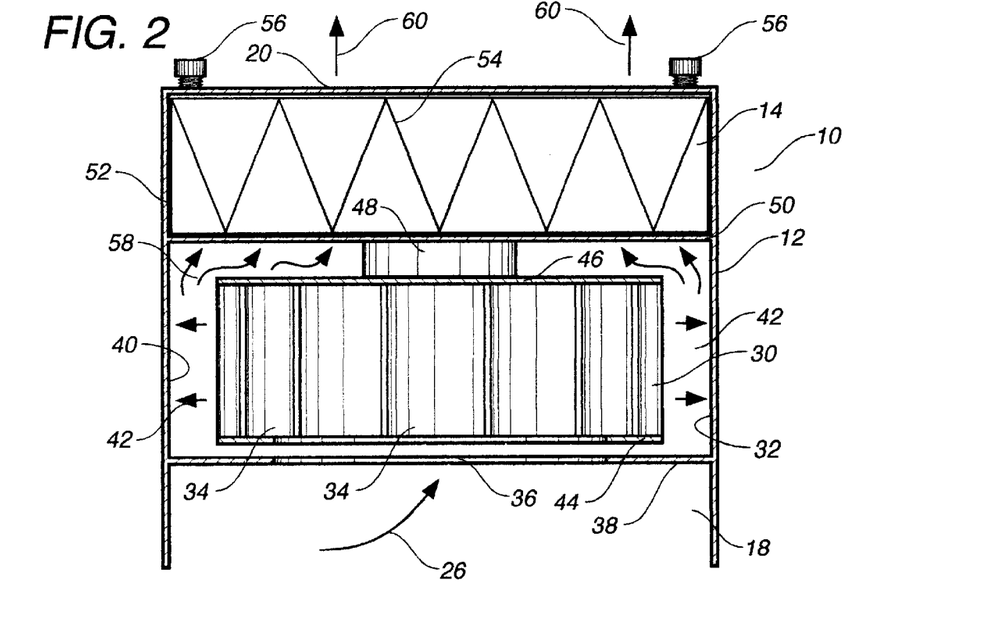
FIG. 2 is a cross-sectional showing the operation of the apparatus of the present invention.

FIG. 2 illustrates the operation of the apparatus 10 of the present invention. As can be seen in FIG. 2, fumes 26 initially enter the inlet slot 18 at the bottom of the apparatus 10. A backward inclined impeller 30 is positioned within the interior cavity 32 in the housing 12 of apparatus 10. The impeller has backward inclined impeller blades 34 which serve to pull the fumes 26 through an inlet opening 36 on a horizontal flat lower surface 38 and to direct such fumes radially outwardly toward the wall 40 of the interior cavity 32. Arrows 42 show the manner in which the particulate-laden fumes are directed toward the wall 40. Each of the impeller blades 34 extends from a bottom annular rim 44 to a closed top surface 46. A motor 48 is connected to the closed top surface 46 of the impeller 30. It can be seen that the fumes 26 are drawn upwardly into an interior cavity of the impeller 30. The specific configuration of the impeller blades 34 serves to direct such fumes radially outwardly from the open interior area of the impeller 30 toward the wall 40 of the interior cavity 32.

In FIG. 2, it can be seen that the motor 48 is attached to the lower surface of a horizontal strut extending across the interior cavity 32 of the housing 12. The motor 48 is interposed between the closed top 46 of the impeller 30 and the filter 14. Unlike prior art devices, the motor 48 is directly connected to the impeller 30 such that all of the components of the present invention can be retained within a small housing 12. The backward inclined impeller blades 34 on the impeller 30 create a strong suction which effectively "pumps" the air into the inlet 36 and then directs the fumes radially outwardly therefrom.

The filter 14 includes a framework 52 which serves to receive a HEPA filter 54 therein. HEPA filter 54 is considered a "mini-pleated" filter. This "mini-pleated" filter 54 is folded in accordion-style fashion within the interior of framework 52. The framework 52 is slidably received within a receptacle formed by the horizontal support surface 50 and other interior surfaces of the housing 12. Screws 56 are positioned on the top surface 20 of the housing 12. Screws 56 serve to establish compressive contact between the bottom surface of the framework 52 and a filter seal (to be described hereinafter). As such, inadvertent leakage of toxic fumes from the interior of the apparatus 10 is prevented. Screws 56 can be suitably tightened so as to effectively establish the compressive contact or to release the filter 14 for removal, cleaning, or replacement.

In FIG. 2, it can be seen by arrows 58 that the particulate-laden fumes will "bounce" off of the wall 40 and then flow upwardly into the filter 14. This "bouncing" effect caused by the impeller 30 causes the particulate-laden fumes to be evenly distributed across the under surface of the HEPA filter 54. Experiments with the present invention have shown that the distribution of filtered particles occurs evenly over the entire surface of the HEPA filter 54. This avoids flow patterns in which areas of the HEPA filter 54 are completely "clogged" while other areas remain open. As such, the present invention improves the life of the HEPA filter 54 and allows the greater passage of air therethrough. Whenever restrictions occur in the flow surface of the HEPA filter 54, then the desired particulate removal capabilities are impaired. By evenly distributing the flow of air across the entire surface of the HEPA filter 54, greater particulate removal efficiency is assured. Arrows 60 show the flow of air after it passes through the HEPA filter 54 and outwardly of the top 20 of the housing 12. The filtered air 60 is free of contaminating particulates.

Unlike prior art devices that employ the use of fans, the user of the impeller 30 greatly improves the ability to pass relatively large amounts of air through the device. Impeller 30 is necessary so as to overcome the resistance of the filter 54 to air flow. If fans and other devices were used in place of the impeller 30, then the fan would be ineffective at pushing enough air through the filter 54 so as to remove solder fumes. It is only with extensive experiments with the present invention that an arrangement of components was found which enabled sufficient volumes of air to pass through the filter 54.

Figure 3:
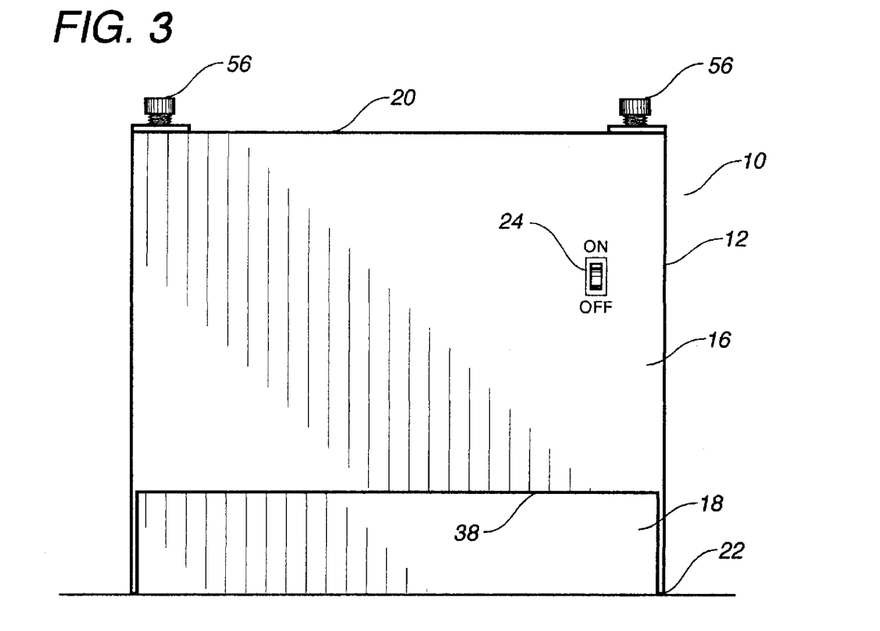
FIG. 3 is a front elevational view of the apparatus of the present invention.

FIG. 3 shows the front surface 16 of the apparatus 10 of the present invention. The front surface 16 is a flat vertical surface having a bottom edge 22. The inlet slot 18 is formed between the bottom edge 22 and the lower flat surface 38 (in which the inlet opening 36 is formed). The bottom edge 22 is configured so that the apparatus 10 can rest easily on any flat horizontal surface. The on/off switch 24 is positioned on the front surface 16 so as to face the user. It can be seen that compressive contact screws 56 are positioned at the top 20 of the front surface 16. Screws 56 are used so as to effectively position the filter 14 in sealed relationship on the interior of the housing 12.

Figure 4:
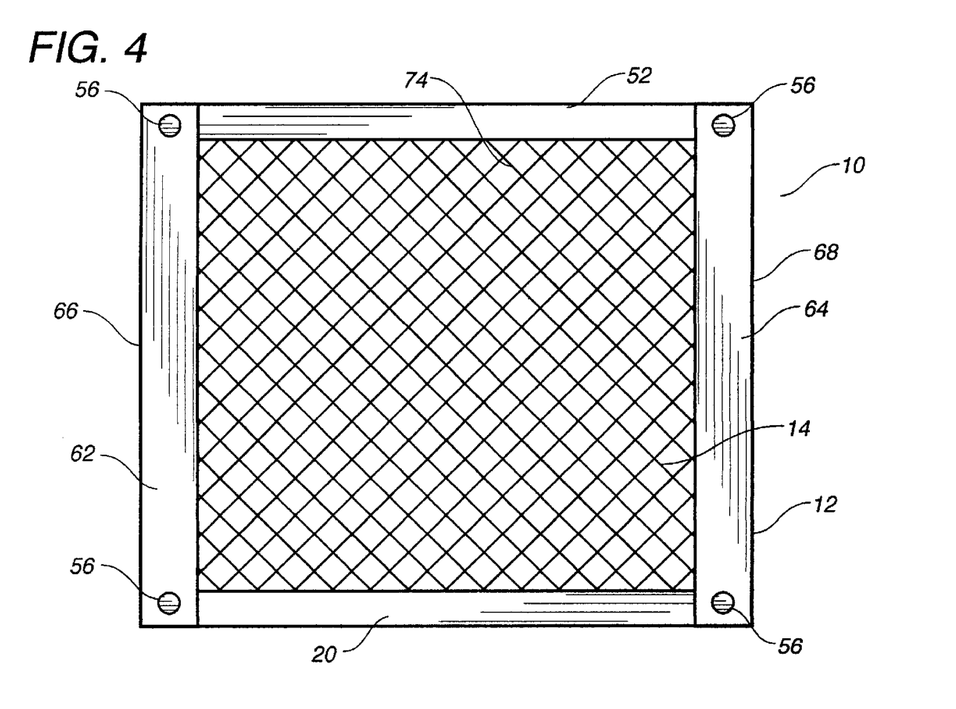
FIG. 4 is a plan view of the apparatus of the present invention.

FIG. 4 shows a top view of the apparatus 10. In particular, it can be seen that the filter 14 is positioned across the top surface 20 of the apparatus 10. Framework 52 will surround the periphery of the filter 14. The framework 52 is received within a slot formed by the overlapping top edges 62 and 64 of sides 66 and 68, respectively, of the housing 12. These overlapping top edges 62 and 64 will be adjacent to the sides of the framework 52 of filter 14. Screws 56 are positioned at the corners of the surfaces 62 and 64 so as to extend downwardly for contact with the framework 52 of the filter 14. A filter screen 74 extends across the top surface of the filter 14 and is retained within the framework 52. Filter screen 74 is a mesh type of screen which extends over the top surface of the HEPA filter 54. The filter screen 74 serves to prevent any destructive contact from occurring with the HEPA filter. The filter screen 74 is suitably open so as to prevent any impairment to the flow of filtered air from the filter 14.

Figure 5:
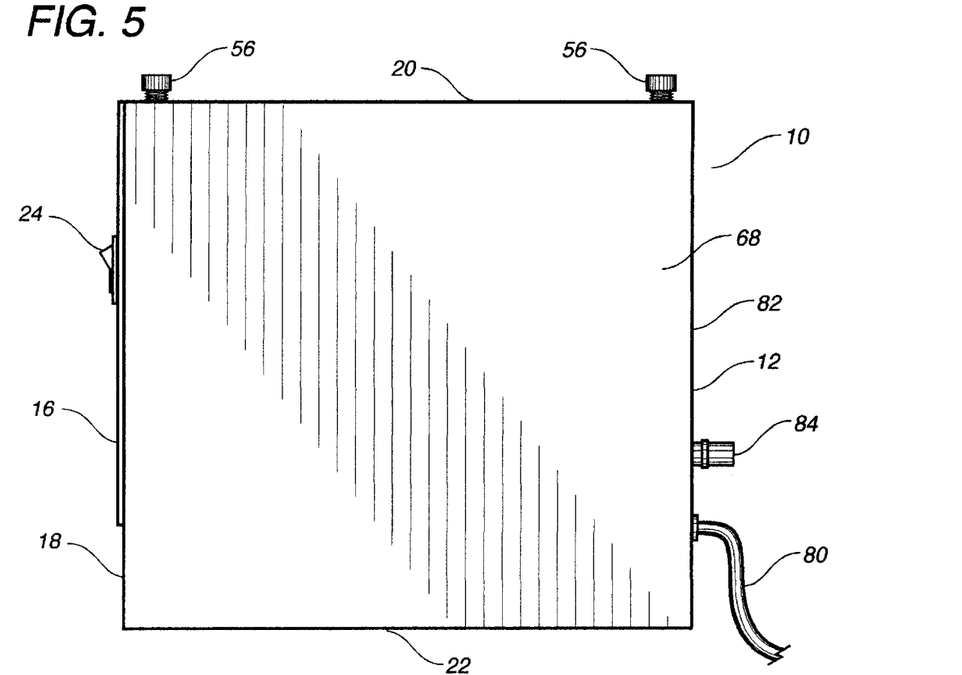
FIG. 5 is a side view of the apparatus of the present invention.

FIG. 5 shows the side view of the apparatus 10 of the present invention. In particular, side 68 of the housing 12 is illustrated. It can be seen that the on/off switch 24 extends outwardly of the front surface 16 of the housing 12. Slotted opening 18 is located adjacent to the bottom 22 of the housing 12. Side 68 is a solid rectangular side which extends from bottom 22 to the top 20. Screws 56 are arranged on the top 20 of the housing 12 in the manner described hereinbefore.

In FIG. 5, it can be seen that a power supply cord 80 extends outwardly from the back surface 82 of the housing 12. Power supply cord 80 serves to deliver electrical energy to the motor 48 of the impeller 30. The power supply cord 80 is a three wire grounded power cord. A fuse 84 is connected to the housing 12. If a short circuit should develop in the power supply, then the fuse 84 will "blow" so as to stop the flow of electricity to the housing 12. The housing 12 is made of a conductive material, preferably steel. Since the housing 12 is grounded, static discharge is effectively presented. It is important that the housing 12 of the present invention be formed of a conductive material so as to prevent this static discharge. Enclosures formed of non-conductive material could cause static discharge. Use of the fuse 84 will prevent any inadvertent electrical shock to the user.

Figure 6:
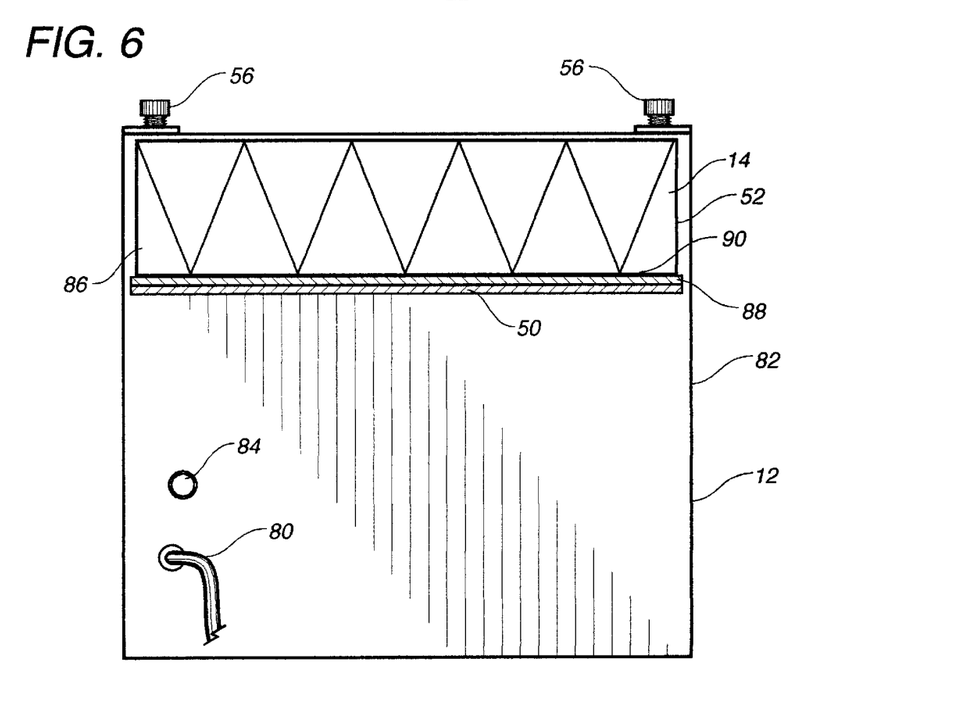
FIG. 6 is a back view of the apparatus of the present invention.

FIG. 6 shows the view of the back surface 82 of housing 12. Importantly, in FIG. 6, it can be seen that the framework 52 of filter 14 is positioned within a receptacle area 86 on the interior of housing 12. A filter seal 88 is interposed between a horizontal support surface 50 and the bottom surface 90 of the framework 52 of filter 14. In normal use, it is important to establish an air-tight seal between the bottom surface 90 of the framework 52 of filter 14 and the horizontal support surface 50 on the interior of the housing 12. The filter seal 88 is a foam or elastomeric ring which extends around the bottom surface 90 of the framework 52 for the filter 14. By rotating screws 56 such that the screws 56 exert a compressive contact onto the top of the framework 52, a positive air-tight seal is established between the filter 14 and the horizontal support surface 50 of the housing 12. As such, the filter 14 and its associated framework 52 are effectively retained within the interior of the housing 12. Leakages of fumes are prevented by this arrangement. If any leakages would occur, then the HEPA filter 54 would ineffectively remove the fumes. Since the air pressure would flow to the point of least resistance, any air leakages between the framework 52 and the support surfaces of the receptacle 86 of housing 12 would cause a diversion of air flow.

In FIG. 6, it can be seen that the fuse 84 is located on the back surface 82. Also, the power supply cord 80 extends outwardly of this back surface 82.

Figure 7:
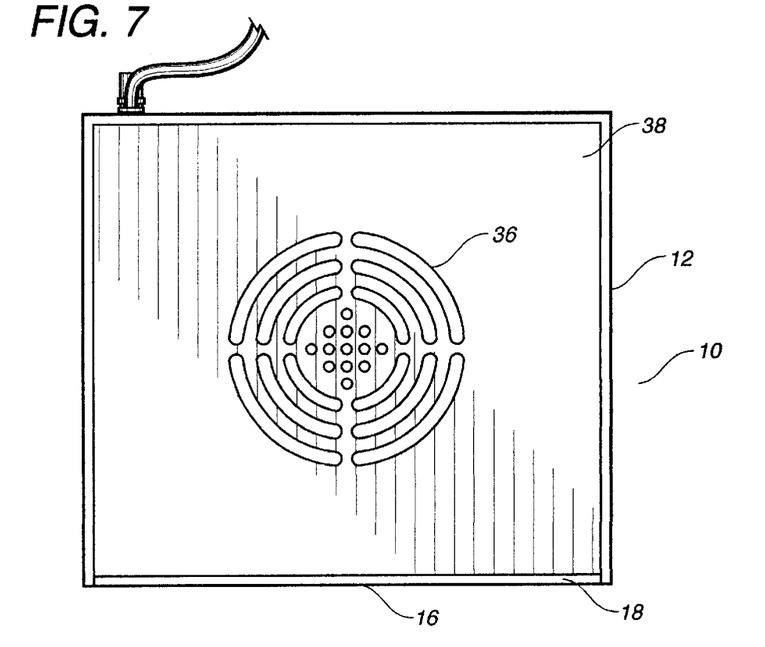
FIG. 7 is a bottom view of the apparatus of the present invention.

FIG. 7 shows a bottom view of the apparatus 10 of the present invention. In FIG. 7, the inlet opening 36 is illustrated with particularity. It can be seen that the inlet opening 36 is a generally circular vented opening which allows particulate-laden air to enter the interior of the housing 12. The inlet opening 36 is located generally centrally in the flat lower surface 38. The particulate-laden air will flow through the inlet slot 18 on the front surface 16 of the housing 12. The impeller 30, located on the interior of the housing 12, will effectively "pump" the particulate-laden air through the inlet opening 36.

Figure 8:
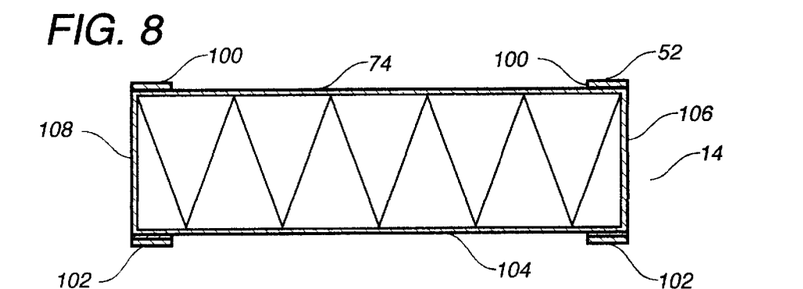
FIG. 8 is a cross-sectional view of the filter as used in the present invention.

FIG. 8 is an isolated view showing the filter 14 as received within framework 52. It can be seen that the framework 52 has top edges 100 and bottom edges 102. Edges 100 and 102 will overlap filter screen 74 and filter screen 104, respectively. It can be seen that the filter screen 74 will extend across the top of the HEPA filter 54. The filter screen 104 extends across the bottom of the HEPA filter 54. These filter screens 74 and 104 prevent destructive contact from occurring with the HEPA filter 54. The overlapping edges 100 and 102 extend inwardly from the sides 106 and 108 of the framework 52. The framework 52 serves as a convenient apparatus for allowing the filter 54 to be properly inserted within the housing.

Figure 9:
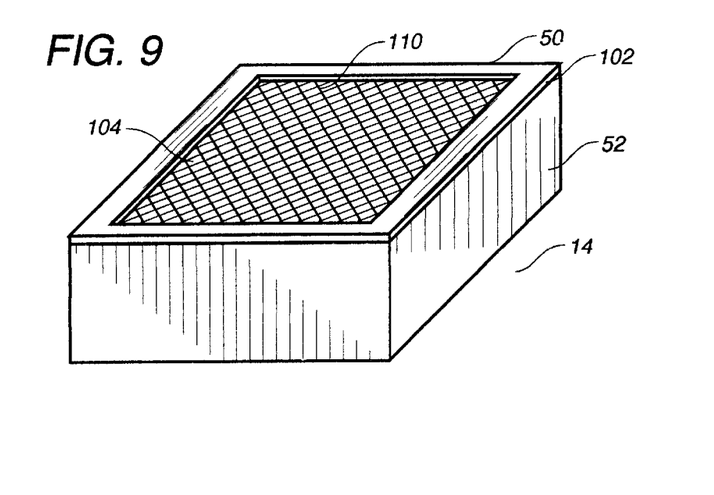
FIG. 9 is a perspective view of the framework for the receipt of the filter of the present invention.

FIG. 9 shows the filter 14 as illustrated in a bottom perspective view. In this bottom perspective view, it can be seen that the framework 52 is a generally rectangular configuration. The filter seal 50 is a open rectangular ring which extends around the bottom edges 102 of the framework 52. The interior 110 of the filter seal 50 exposes the filter screen 104 and the HEPA filter 54 (contained within the interior of the framework 52). The filter seal 50 can be formed of an elastomeric or a foam material. The filter 14 can be easily installed within the housing 12 in the form of a cartridge-type of arrangement.

Figure 10:
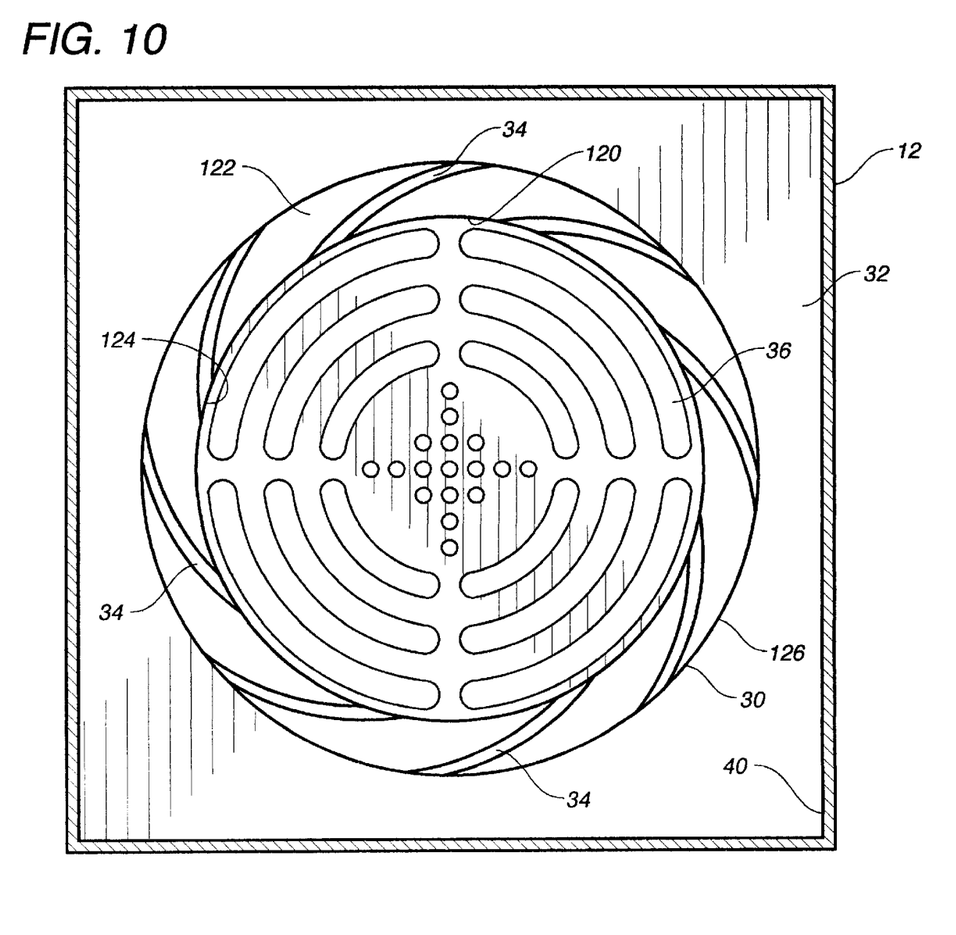
FIG. 10 is a cross-sectional view of the apparatus of the present invention showing, in particular, the configuration of the impeller blade relative to the inlet opening.

FIG. 10 illustrates the manner in which the backward-inclined impeller 30 is positioned within the interior cavity 32 of the housing 12. As can be seen in FIG. 10, the inlet opening 36 is located centrally of the open interior 120 of the impeller 30. Annular ring 122 has an inner edge 124 which is positioned in proximity to the periphery of the inlet opening 36. The impeller blades 34 are backward-inclined impeller blades which extend radially outwardly from the inner edge 124 toward the outer edge 126 of the annular ring 122. When the impeller 30 is rotated by the motor 48, the suction created on the interior 120 of the impeller 30 will effectively cause particulate-laden fumes to enter the openings of the inlet 36. The configuration of the backwardly-inclined impeller blades 34 will cause such fumes to be directed radially outwardly so as to impinge upon the wall 40 on the interior cavity 32 of housing 12.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A particulate removal apparatus comprising:

a housing having an inlet opening formed at a bottom thereof and having an interior cavity, said housing having a solid walls surrounding said interior cavity, said housing having an outlet formed at a top thereof;

a filter means positioned in said housing adjacent said top of said housing, said filter means for removing particles from air passing therethrough, said filter means having an outlet for passing filtered air from said housing through said outlet of said housing;

an impeller means positioned within said interior cavity of said housing, said impeller means having backward inclined impeller blades, said solid walls of said housing being generally parallel to an axis of rotation of said impeller means, said impeller means for pulling air through said inlet opening and for directing such air toward said walls, said impeller blades generally surrounding said inlet opening; and a motor means positioned within said interior cavity of said housing and positioned between said impeller means and said filter means, said motor means for rotating said impeller means.

2. The apparatus of claim 1, said housing having a generally cubical configuration of no more than 729 cubic inches.

3. The apparatus of claim 1, said housing having a front surface with an inlet slot formed across a bottom edge of said front surface, said inlet slot being in fluid communication with said inlet opening.

4. The apparatus of claim 3, said housing having a generally flat lower surface extending above said inlet slot, said inlet opening being formed generally centrally in said lower surface.

5. The apparatus of claim 4, said impeller blades of said impeller means radiating outwardly from a periphery of said inlet opening.

6. The apparatus of claim 5, said impeller blades being supported on an annular rim, said annular rim positioned adjacent to said inlet opening, said annular rim having an inner edge adjacent said periphery of said inlet opening.

7. The apparatus of claim 1, said housing having a horizontal strut extending thereacross, said horizontal strut positioned between said impeller means and said filter means, said motor means being affixed to said horizontal strut.

8. A particulate removal apparatus comprising:

a housing having an inlet opening formed at a bottom thereof and having an interior cavity;

a filter means positioned in said housing adjacent said top of said housing said filter means for removing particles from air passing therethrough, said filter means having an outlet for passing filtered air through an outlet at a top of said housing;

an impeller means positioned within said interior cavity of said housing, said impeller means having backward inclined impeller blades, said impeller means for pulling air through said inlet opening and for directing such air toward a wall of said interior cavity, said impeller blades generally surrounding said inlet opening, said impeller means having an open interior at a bottom and a closed top, said backward inclined impeller blades for directing air radially outwardly from said open interior toward said solid wall of said interior cavity; and a motor means positioned within said interior cavity of said housing and positioned between said impeller means and said filter means, said motor means for rotating said impeller means said motor means attached to and located above said closed top of said impeller means.

9. The apparatus of claim 1, said housing being formed of a conductive material, the apparatus further comprising:

a fuse means connected to said housing and to a power supply to said motor means, said fuse means for shutting off a flow of electricity when a short circuit occurs between said power supply and said motor means.

10. The apparatus of claim 1, said filter means further comprising:

a HEPA filter positioned within a framework adjacent a top of said housing, said HEPA filter for removing particles of 0.3 microns at a minimum of 95% efficiency.

11. The apparatus of claim 10, said HEPA filter arranged in an accordion fashion within said framework.

12. The apparatus of claim 10, further comprising:

a first filter screen extending across a top of said HEPA filter and retained within said framework; and a second filter screen extending across a bottom of said HEPA filter and retained within said framework.

13. The apparatus of claim 10, said housing having a horizontal support surface formed therein, said horizontal support surface forming a receptacle for said framework within said housing, said filter means further comprising:

a filter seal interposed between a bottom surface of said framework and said horizontal support surface, said filter seal being formed of an elastomeric or foam material.

14. The apparatus of claim 13, said filter means further comprising:

compressive contact means affixed to said housing and interactive with said framework, said compressive contact means for forcing said framework into air-tight compressive contact with said filter seal.

15. A particulate removal apparatus comprising:

a housing having an inlet opening formed at a bottom thereof and having an interior cavity;

a motorized backward inclined impeller means positioned within said interior cavity, said impeller means for pulling air through said inlet opening and directing the air toward a solid wall of said interior cavity; and a filter means positioned in said housing above said impeller means, said filter means for removing particles from air passing therethrough, said filter means comprising a HEPA filter positioned within a framework within said housing, said HEPA filter arranged in an accordion-style folded configuration within said framework, said filter means passing filtered air outwardly of a top of said housing, said housing having a horizontal support surface formed therein, said horizontal support surface forming a receptacle for said framework within said housing, said filter means further comprising:

a filter seal interposed between a bottom surface of said framework and said horizontal support surface, said filter seal being formed of an elastomeric or foam material; and compressive contact means affixed to said housing and interactive with said framework, said compressive contact means for forcing said framework into airtight compressive contact with said filter seal.

16. The apparatus of claim 15, further comprising:

a first filter screen extending across a top of said HEPA filter and retained within said framework; and a second filter screen extending across a bottom of said HEPA filter and retained within said framework.

17. The apparatus of claim 15, said impeller means comprising:

an impeller having impeller blades affixed between a closed top surface and an annular bottom surface, said annular bottom surface supporting said blades such that said blades have an inner edge extending around a periphery of said inlet opening; and a motor means connected to said closed top surface of said impeller, said motor means for rotating said impeller around said inlet opening, said motor means being interposed between said filter means and said impeller within said interior cavity.

18. The apparatus of claim 17, said housing having a horizontal strut extending thereacross, said horizontal strut positioned between said impeller means and said filter means, said motor means being affixed to said horizontal strut.

* * * * *